(No Model.)
W. H. CARPENTER.
CAMERA TRIPOD.
No. 378,430. Patented Feb. 28, 1888.
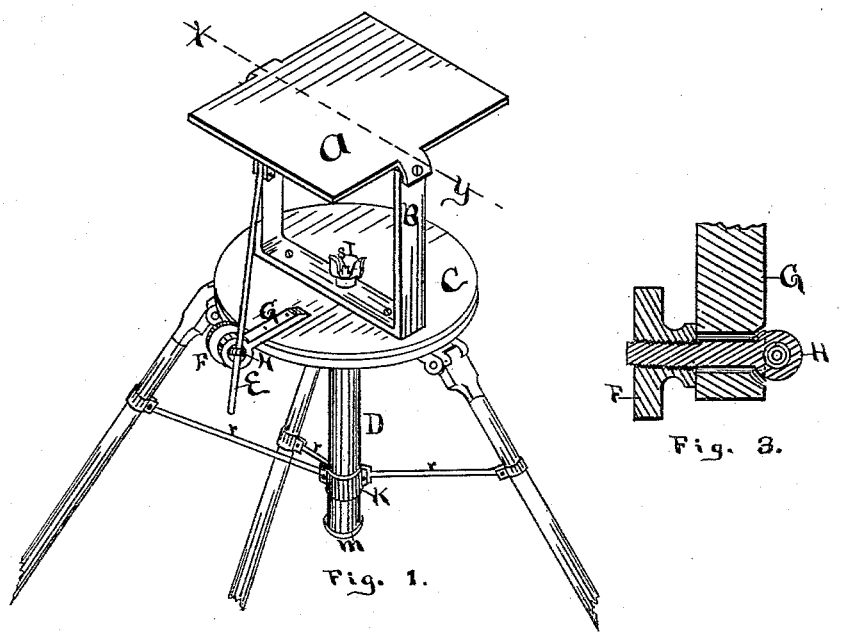
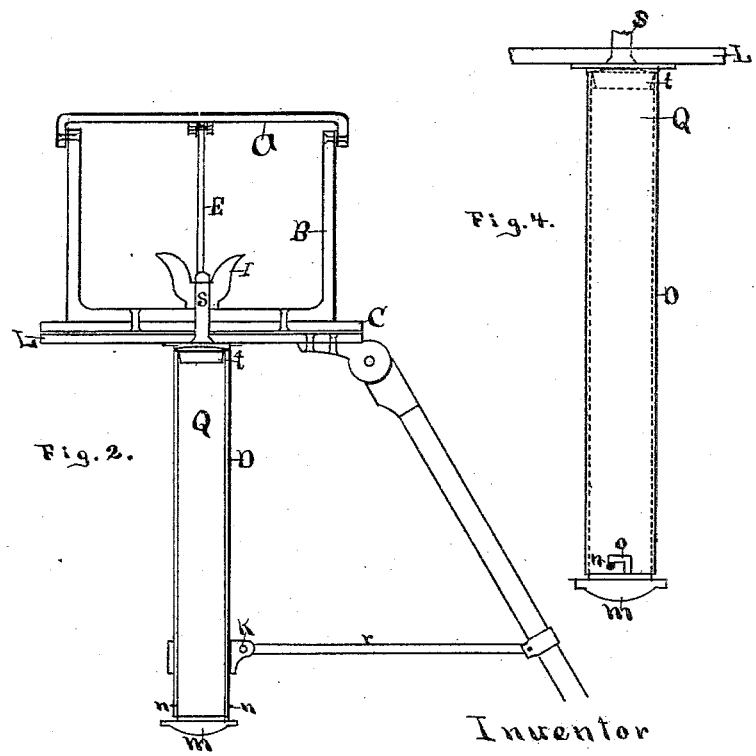
Attest.
F. M. Hodge.
A. J. Feed.
Inventor
Wm. H. Carpenter,
Per. A. G. Fuller,
Attorney.

UNITED STATES PATENT OFFICE.

WILLIAM H. CARPENTER, OF CADILLAC, MICHIGAN.

CAMERA-TRIPOD.

SPECIFICATION forming part of Letters Patent No. 378,430, dated February 28, 1888.

Application filed July 23, 1887. Serial No. 245,064. (No model.)

*To all whom it may concern:*

Be it known that I, WILLIAM H. CARPENTER, a citizen of the United States, residing at the city of Cadillac, county of Wexford, and State of Michigan, have invented new and useful Improvements in Camera-Tripods, of which the following is a specification.

My invention relates to camera tripods in which the head or piece to which the camera is attached when in use is made to revolve in both a vertical and horizontal direction by means of axes at right angles to each other to bring the object of which a likeness is to be taken into the center or proper position in the field of view. It also relates to camera-tripods provided with a dark magazine or chamber for the carrying of sensitized paper or artists' materials.

The objects of my invention are to provide, first, a better method of regulating the motions of the camera upon its vertical and horizontal axes, to make it more firm and steady when in use, and to provide a convenient and capacious dark-magazine which can be used, opened, or closed at any time without disturbing the tripod, if set. I attain these objects by the mechanism illustrated in the accompanying drawings, in which like letters refer in the different figures to the same parts, and in which—

Figure 1 is a perspective view of my tripod. Fig. 2 is a vertical section on the line *x y* of Fig. 1. Fig. 3 is an enlarged view of a clamp-fastening of the vertical moving part of the head, and Fig. 4 is a view of the dark-magazine.

In Figs. 1 and 2, A is a plate, to which the camera is attached, and may be of any size or shape desired.

B is a double standard, to which the plate A is attached by any convenient hinge or joint allowing free vertical motion. The double standard B is either firmly fastened to or is made a part of a plate, C. Plate C has also attached to it, on its edge and preferably at that point which equally divides the distance between the two limbs of the double standard B, an arm or bar, G, which is provided at its outer end with an aperture, P, countersunk on one side, and so adapted to receive the enlarged head of a clamping-bolt, H, which, passing through the arm G, is provided on its other end with a set-screw, F.

Through the head of the bolt H is an aperture adapted to receive the rod E, and to allow rod E to slide freely up and down when the set-screw F is loosened, but holding rod E rigidly when the set-screw F is tightened by drawing the said rod E against the side of the arm G. The rod E, which passes through the bolt H, is fastened at its upper end by any convenient flexible joint to the plate A.

Immediately below the plate C, and upon which it rests and turns, is another plate, L, to which are attached the legs of the tripod, and from which a center pin, *s*, rises, which passes through plate C, and is provided with a clamping thumb-screw, I, which holds the plates L and C firmly together when set, and when loosened allows plate C to revolve freely horizontally upon plate L. To the bottom of plate L, between the legs of the tripod, and fastened in any convenient manner, is a magazine or dark-chamber composed of two concentric tubes, D and Q. The tube D is the larger, and is provided at its lower end with a slot, *o*, having a vertical and horizontal section. The tube Q is of such diameter that it can be slipped inside of D, fitting it closely. At its lower end it is closed by a fixed cap, *m*, and provided with pins or projections *n*, adapted to be engaged by the slots *o*. Its upper end is closed by a movable cap or plug, *t*. Around the tube D, which is the part of the magazine permanently fixed to plate L, may be the sliding collar K, which, by means of the brace-rods *r*, connect it with the legs of the tripod, and thus protect it from wrenches and strain in drawing out or replacing the tube Q, which is the magazine proper.

In using my improved camera-tripod the camera may be given any desired vertical or horizontal position, and be rigidly held in such position by means of the rod E and its clamping apparatus in the manipulation of the plate A, and by the revolution of plate C about the center pin, *s*, upon plate L, and by setting the thumb-screw I. The magazine or dark-chamber attached to the under side of the plate L is opened by simply turning the tube Q until the pins *n* come into the vertical section of the slots *o*, when it can be drawn out and opened by removing the cap or plug *t*.

Having thus described my invention so that any one skilled in the manufacture of tripods can build the same, what I claim as novel, and desire to secure by Letters Patent, is—

1. In a camera-tripod, the combination of an upper plate, A, adapted to be revolved upon a double standard, B, vertically with said standard B, rigidly attached to or forming a part of a lower plate, C, substantially as and for the purpose above set forth.

2. In a camera-tripod, the combination of the plate A, the double standard B, and the plate C, with the lower plate, L, said plate C being adapted to be revolved horizontally about a center pin, s, upon the plate L, or to be rigidly attached to plate L by a thumb-screw, I, on the center pin, s, as and for the purpose above set forth.

3. In a camera-tripod, the combination of an arm, G, attached to or a part of a plate, C, and provided at its outer end with a clamping-bolt, H, with a rod, E, attached at its upper end by a flexible joint to the plate A and passing through the clamping-bolt H, substantially as above set forth.

4. The combination, with a camera-tripod, of a magazine or dark-chamber attached to a lower plate, L, of the head to which the legs of the tripod are attached, said magazine being situated between said legs and attached thereto by brace-rods r, substantially as above set forth.

5. The combination, with a camera-tripod, of a magazine or dark-chamber of two concentric tubes, D and Q, of such diameters that Q is adapted to slip within and closely fit D, substantially as above specified.

6. The combination, with a camera-tripod, of a magazine consisting of two concentric tubes provided with a slot, o, in the outer tube, D, adapted to engage the pins n of the inner tube, Q, with said pins n of said tube Q, substantially as above set forth.

7. The combination, in a camera-tripod, of a magazine composed of two tubes, D and Q, the tube D being rigidly attached to the under side of the plate L and closed at its top by the plate L, and the tube Q being permanently closed at the lower end by the fixed cap m and the upper end closed by a movable cap, t, all substantially as above set forth.

8. The combination, in a camera-tripod, of a magazine or dark-chamber attached to a plate, L, and provided with a sliding collar, K, which is attached by flexible joints to the legs of the tripod by brace-rods r, substantially as above set forth.

WM. H. CARPENTER.

Witnesses:
THOMAS A. HALL,
FRED. M. HODGE.